E. R. WHITNEY.
ATTACHMENT FOR PLANERS, &c.
APPLICATION FILED DEC. 29, 1903.
1,057,023.
Patented Mar. 25, 1913.
2 SHEETS—SHEET 1.
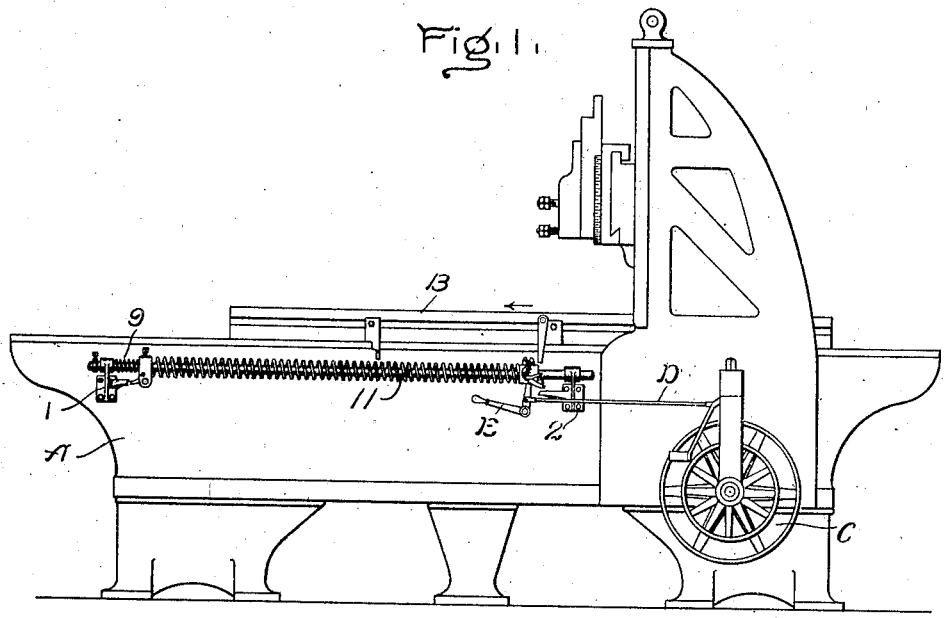
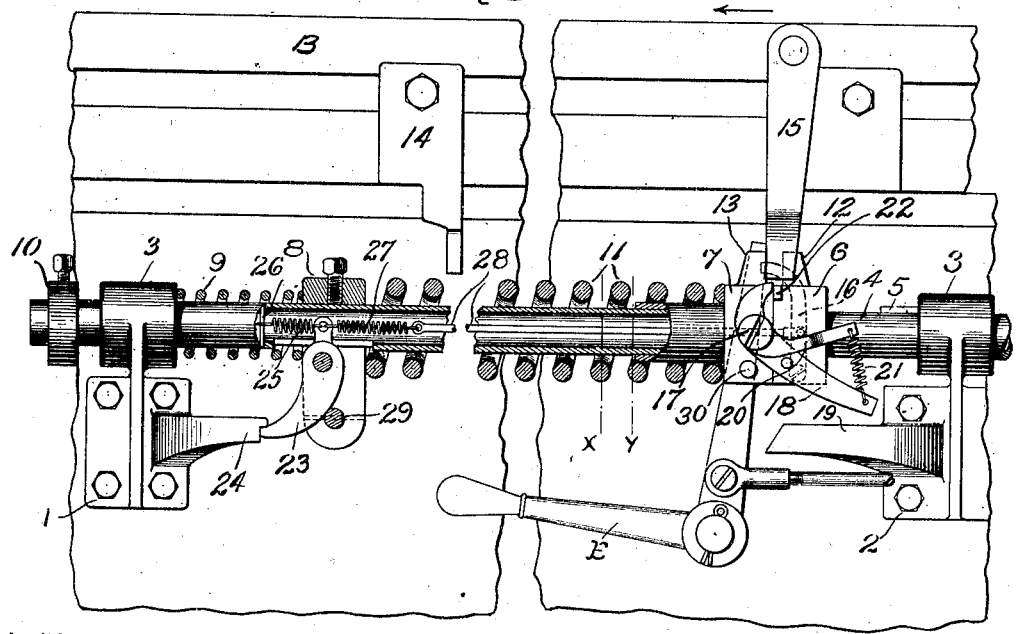
Witnesses:
George A. Thornton
Helen Oxford
Inventor,
Eddy R. Whitney,
By Albert A. Davis
Att'y E. R. WHITNEY.
ATTACHMENT FOR PLANERS, &c.
APPLICATION FILED DEC. 29, 1903.
1,057,023.
Patented Mar. 25, 1913.
2 SHEETS—SHEET 2.
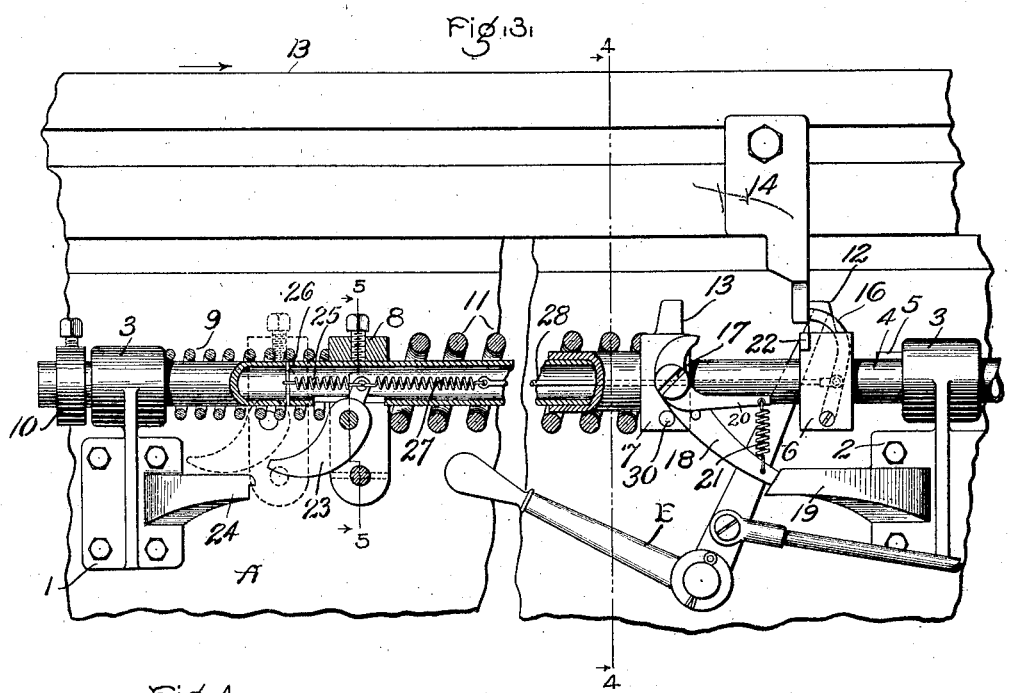
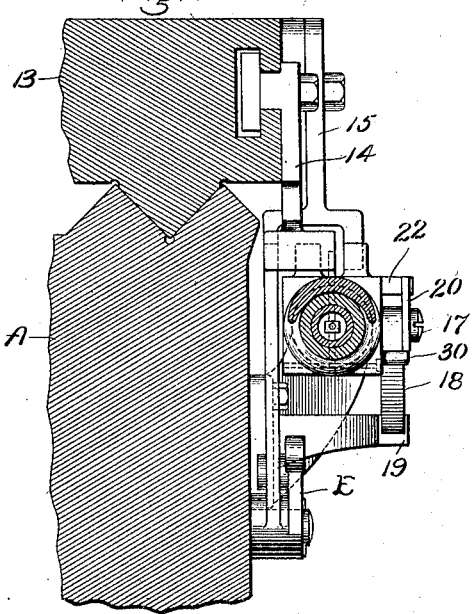
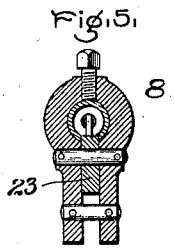
Witnesses:
George A. Thornton.
Helen Orford.
Inventor,
Eddy R. Whitney,
By
Att'y

UNITED STATES PATENT OFFICE.

EDDY R. WHITNEY, OF LYNN, MASSACHUSETTS, ASSIGNOR TO GENERAL ELECTRIC COMPANY, A CORPORATION OF NEW YORK.

ATTACHMENT FOR PLANERS, &c.

1,057,023.

Specification of Letters Patent.  Patented Mar. 25, 1913.

Application filed December 29, 1903. Serial No. 186,936.

*To all whom it may concern:*

Be it known that I, EDDY R. WHITNEY, a citizen of the United States, residing at Lynn, in the county of Essex and State of Massachusetts, have invented certain new and useful Improvements in Attachments for Planers, &c., of which the following is a specification.

The present invention relates to reciprocating machines, and more particularly to that class of reciprocating machines, such as planers, in which the reciprocating part is driven at a high speed in one direction and at a slow speed in the opposite direction. According to the ordinary method of operating reciprocating machines, in which the platen or reciprocating part is arrested in its travel in one direction, reversed and brought up to full speed in the opposite direction entirely by its driving means, the overloads thrown upon the driving means at the times of reversal are greatly in excess, and in many cases multiples, of the loads imposed during the travel of the platen between reversals. Accordingly, since the power and the transmitting devices of machines of this type must be designed to operate under the maximum overload, they are much more expensive and occupy more space than in the case of equivalent non-reciprocating machines.

Attachments in the nature of spring buffers have been employed heretofore in certain instances upon reciprocating machines having the same speed of travel in both directions which were more or less effective in arresting, reversing and bringing up to speed in the opposite direction the reciprocating part, but in accordance with my invention the energy of momentum is conserved on both strokes of reciprocating machines having a high speed of motion in one direction and a slower speed in the other.

My invention has for its object to provide means to conserve the energy of momentum of a reciprocating part having different speeds of travel upon its forward and return strokes, and to re-apply the stored energy to the reciprocating part in amounts in the reverse order of their storage, whereby the part is given, independent of its driving means, a high reverse speed at the end of its slow stroke and a slow speed upon reversal from the high-speed stroke.

In carrying out my invention I mount upon a suitable support on the bed of the planer or other reciprocating machine a compressible device such as a spring and two independently movable heads adapted to be engaged and actuated in opposite directions against the tension of the spring by suitable devices projecting from the platen of the machine. Each head is provided with suitable latch devices adapted to engage stationary stops, and with means for controlling the engagement thereof, so that while one head is held stationary the second may be moved to put the spring under its maximum tension, as in arresting the platen at the end of its high-speed stroke, and, after permitting a fractional reaction of the spring sufficient to start the platen upon its slow-speed stroke, it is arrested by its latch with the spring still under considerable tension. Then when the first head is engaged by the platen as it approaches the end of its slow-speed stroke the tension of the spring will be again raised to its maximum and the latch of the first head moved out of operative position, so that upon recoil the spring is free to exert its full force upon the platen to start it upon its return high-speed stroke.

The invention will be more readily understood by reference to the following description and the accompanying drawings forming a part of this specification, in which—

Figure 1 is a side elevation of a machine planer with a reversing attachment embodying my invention applied thereto; Fig. 2 is a sectional elevation of the reversing device with the parts shown in operative position at the commencement of the high speed reversal of the platen; Fig. 3 is a similar view with the parts in operative position to impart to the platen the maximum force of the compression device; Fig. 4 is a cross-section on line 4 4 of Fig. 3, showing a portion of the planer and connections between the platen and the reversing device; and Fig. 5 is a cross-section on line 5 5 of Fig. 3 showing the construction of the support for the left-hand latch.

A is the bed of a machine planer; B is the platen mounted in longitudinal ways thereon, and upon which the work to be machined is secured; C represents a set of different-sized pulleys by which power is communicated to suitable mechanism within the bed for reciprocating the bed B with a slow speed on its cutting or forward stroke, and with a high speed on its return stroke; and D is a belt-shifting device controlled by a bell-crank E. These parts are of the usual construction, and accordingly need not be described in detail here.

Upon the front side of the bed A I mount the support of my attachment, consisting of brackets 1 and 2 provided at their upper ends with bearings 3 parallel to the line of travel of the platen B and in which a rod 4 is mounted for longitudinal movement. The rod 4 consists of a cylindrical tube of a length to project through both bearings 3 and is held from rotary movement therein by a feather 5.

Upon the rod 4 near the right-hand bracket 2 and opposite the upper end of the shipping lever E are mounted a fixed head 6 and a sleeved movable head 7, and near the bracket 1 is mounted a fixed lug 8. Surrounding the rod 4 between bracket 1 and lug 8 is a light spring 9 which normally tends to hold the rod in its right-hand position with the stop collar 10 abutting the end of the bearing 3. Between the lug 8 and the movable head 7 is arranged a powerful compression spring 11 normally acting to press the movable head into engagement with the fixed head 6.

The heads 6 and 7 are provided on their upper ends with disalined projections 12 and 13 adapted to be engaged by stop projections 14 and 15 carried by the reciprocating platen B and adjustably secured thereto by clamping bolts. The left-hand stop 14 has its lower end made broad so as to engage the shipping crank E, the projection 12 from the head 6 and a trigger 16. The right-hand stop has a forked lower end whereby it is adapted to engage the shipping crank E and the projection 13 on the sleeved head 7 without interferring in its travel with the projections from the other head 6.

The sleeved head 7 is provided on its front side with a pivot 17 upon which is fulcrumed a latch 18 adapted to engage at its free end with a shouldered projection 19 from the right-hand bracket 2, and a trigger 20 having its lower end connected to the free end of the latch 18 by a spring 21 and its upper end bent forward and adapted to be engaged by a shoulder 22 carried by the right-hand head 6. The lug 8 is bifurcated at its lower end and carries therein a pivoted latch 23 adapted to engage at its free end with a shouldered projection 24 on the left-hand bracket 1. The upper end of the latch 23 extends through a slot formed in the lower side of the supporting rod 4, and is connected on the left-hand side to a short spring 25 which extends to a cross bar 26 within the rod 4, and on the right-hand side to a longer spring 27 and through a link 28 to the trigger 16 fulcrumed in the right-hand head 6. The lug 8 and the head 7 are provided with suitable shouldered stops 29 and 30 to limit the backward movement of the respective latches 23 and 18.

The operation of the attachment is as follows: When neither stop 14 or 15 is in engagement with its respective head the rod 4 and parts carried thereby are in the position indicated in Fig. 1 with the left-hand latch 23 in its lowermost position. Upon the engagement of the stop 15 with the sleeved head 7, as the platen B moves on its high-speed stroke to the left or in the direction of the arrow, Fig. 2, the shipping crank E and the rod 4 are moved to the left until the latch 23 engages the shouldered projection 24; then the lug 8 serves as a fixed abutment for the spring 11 which is put under full compression in bringing the platen B to a stop with the left-hand edge of the sleeved head 7 in about the position of dotted line X, Fig. 2. The recoil of the spring 11 immediately acts to start the platen upon its stroke in the opposite direction, but on account of the latch 18 engaging the shouldered projection 19 the head 7 is arrested at line Y, Fig. 2, with the speed of the platen raised to only a fraction of that it had when moving to the left. The platen then travels under the influence of the power means to near the opposite end of its slow-speed stroke, whereupon the left-hand stop 14 engages the shipping crank E and the trigger 16, putting the spring 27 connected to pawl 23 under tension; then engages projection 12 of the right-hand head and moves it, the rod 4 and all parts carried thereby, except the sleeved head 7, to the right, as shown in Fig. 3, a distance substantially equal to that through which the rod moved upon the recoil at the commencement of the slow-speed stroke, so that the spring is returned to full compression and the latch 23 disengaged from its stop projection 24 and permitted to swing upwardly out of line therewith. The spring 11 is now free to exert its full force upon the platen to start it upon its return stroke at high speed and carries the rod 4 and parts fixed thereto to the left until the right-hand head approaches the other, permitting the shoulder 22 to engage and raise the trigger 20, and then as the heads come together the latch 18 is moved out of engagement with the shouldered projection and permitted to rise out of line therewith under the tension of the trigger spring 21. As soon as the latch 18 has moved clear of the shouldered projection 19 the light spring 9 between the lug 8 and the left-hand bracket operates to return the rod 4 and all parts carried thereby to their original positions ready for a repetition of the cycle of steps above described. The shipping crank E will of course remain as usual in either extreme position until engaged and moved by the opposite stop projection.

I do not desire to restrict myself to the particular form or construction of parts, or the application thereof herein described and shown, since it is apparent that they may be changed and modified in many respects within the scope of the appended claims without departing from my invention.

What I claim as new and desire to secure by Letters Patent of the United States, is,

1. In a device for conserving the energy of momentum of a reciprocating part, the combination of two independent heads adapted to be moved by the reciprocating part, an elastic member adapted to be put under tension by the movement of either head while the other head is held in fixed position, and means for automatically locking and releasing said heads.

2. In a device for conserving the energy of momentum of a reciprocating part, the combination of a support, two independent heads mounted thereon, an elastic member normally operating to force said heads toward each other, means carried by the reciprocating part adapted to engage one or the other of said heads as it approaches the end of its stroke to put said elastic member under tension, and means for automatically locking and releasing said heads.

3. In a device for conserving the energy of momentum of a reciprocating part having a high speed in one direction and a low speed in the other, the combination of two independent heads, an elastic member adapted to be put under tension by the movement of said heads, means carried by the reciprocating part adapted to engage one of said heads as it approaches the end of its hight-speed stroke and put said elastic member under full tension, and means to arrest the retrograde movement of said head after a partial recoil of the elastic member.

4. In a device for conserving the energy of momentum of a reciprocating part having a higher speed of travel on one stroke than on the other, the combination of two independent heads, an elastic member, means connected to the reciprocating part adapted to engage said heads, locking means operatively connected to said heads whereby the elastic member is put under full tension at the end of the high-speed stroke, and a partial recoil permitted to start the reciprocating part upon its slow-speed stroke, the elastic member returned to full tension at the end of the latter stroke and a full recoil of the said member permitted to start the reciprocating part upon its high-speed stroke.

5. In a device for conserving the energy of momentum of a reciprocating part, the combination of a longitudinally-movable rod, a head and a lug fixed thereto near opposite ends, a spring and a movable head mounted thereon between the fixed head and lug, latches connected to said movable head and to said lug, and triggers carried by said heads for controlling said latches.

6. In a device for conserving the energy of momentum of a reciprocating part, the combination of a longitudinally-movable rod, a head and a lug secured thereto near opposite ends, a sliding head and a spring mounted upon said rod between said fixed head and said lug, stationary stops arranged in proximity to said heads and lug, latches pivoted upon said sliding head and said lug, a trigger carried by said sliding head for controlling the latch pivoted thereon, and a latch carried by the fixed head and connected to control the latch carried by said lug.

7. In a device for conserving the energy of momentum of a reciprocating part, the combination of a longitudinally-movable hollow rod, a head and a lug fixed thereto near opposite ends, a sliding head and a spring mounted upon said rod between said fixed head and lug with said heads normally in engagement, stationary stops arranged in proximity to said heads and said lug, latches pivoted upon said sliding head and said lug and adapted to engage said stops, a trigger carried by said sliding head and connected by a spring to the latch pivoted thereon, and a latch carried by said fixed head and connected through the hollow of the rod by a spring to the latch carried by the lug.

In witness whereof, I have hereunto set my hand this twenty-fourth day of December, 1903.

EDDY R. WHITNEY.

Witnesses:
DUGALD McK. McKILLOP,
JOHN J. WALKER.

Copies of this patent may be obtained for five cents each, by addressing the "Commissioner of Patents, Washington, D. C."